(No Model.) 2 Sheets—Sheet 1.

A. STANSEL.
BROADCAST SEEDER.

No. 484,683. Patented Oct. 18, 1892.

WITNESSES
Geo. E. Frech
R. Fitzgerald

INVENTOR
Alonzo Stansel
per
Lehmann & Patterson
attys (No Model.) 2 Sheets—Sheet 2.

A. STANSEL.
BROADCAST SEEDER.

No. 484,683. Patented Oct. 18, 1892.

WITNESSES
Geo. E. Frech.
R. Fitzgerald.

INVENTOR
Alonzo Stansel
per Lehmann & Pattison
attys.

UNITED STATES PATENT OFFICE.

ALONZO STANSEL, OF YORKVILLE, ILLINOIS.

BROADCAST SEEDER.

SPECIFICATION forming part of Letters Patent No. 484,683, dated October 18, 1892.

Application filed September 11, 1891. Serial No. 405,410. (No model.)

*To all whom it may concern:*

Be it known that I, ALONZO STANSEL, of Yorkville, in the county of Kendall and State of Illinois, have invented certain new and useful Improvements in Broadcast Seeders; and I do hereby declare the following to be a full, clear, and exact description of the invention, such as will enable others skilled in the art to which it pertains to make and use it, reference being had to the accompanying drawings, which form part of this specification.

My invention relates to an improvement in broadcast seeders; and it consists in certain novel features of construction and arrangement of parts, which will be fully described hereinafter, and particularly referred to in the claims.

This invention is intended as an improvement upon my patents, No. 368,555, dated August 16, 1887, and No. 438,501, dated October 14, 1890, and the objects are to provide a simple and more effective means for rotating the feed-shaft and feeding the seed to a spreader or scatterer, and also to provide a simple and effective means for regulating the amount of seed fed to the spreader.

Figure 1:
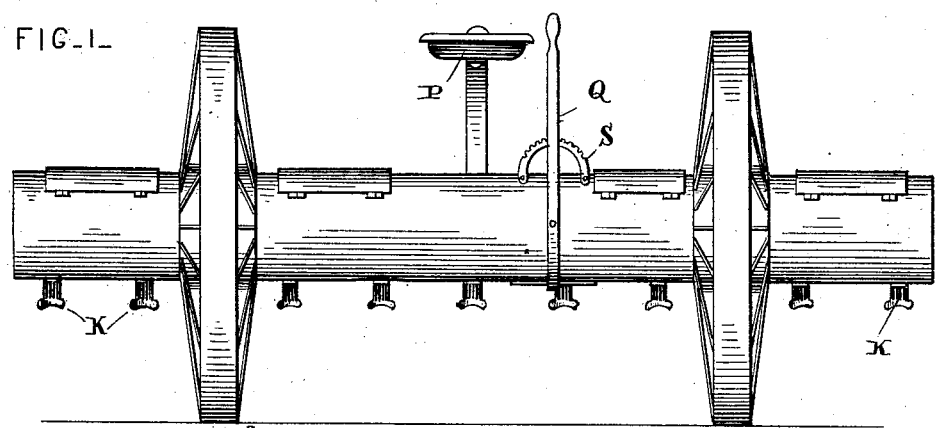
Figure 2:
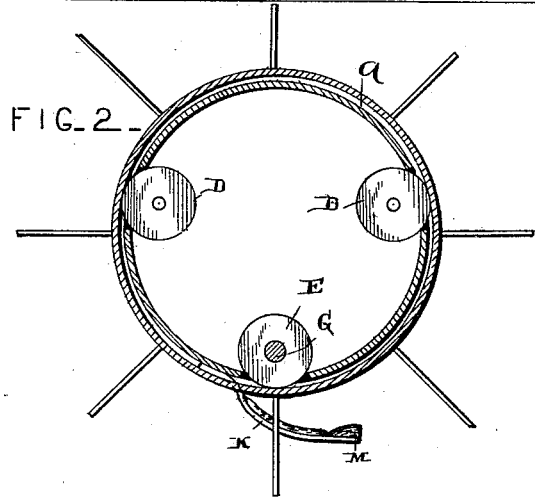
Figure 3:
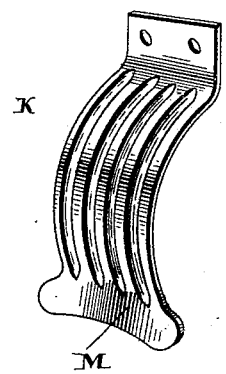
Figure 4:
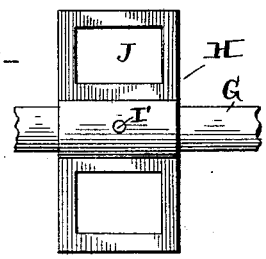
Figure 5:
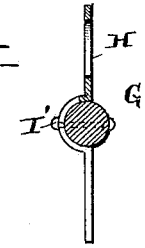
Figure 6:
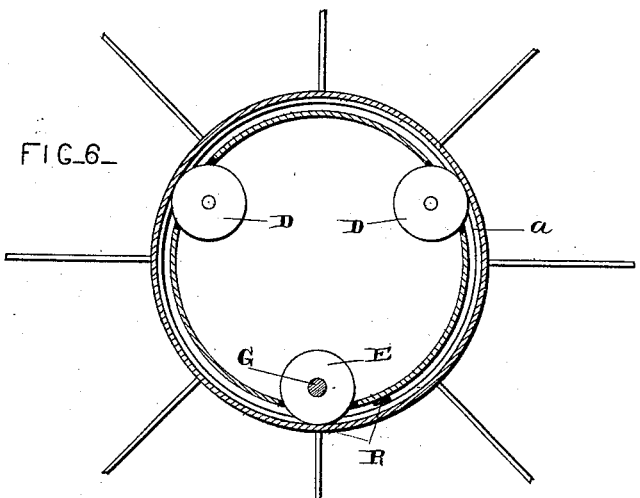
Figure 7:
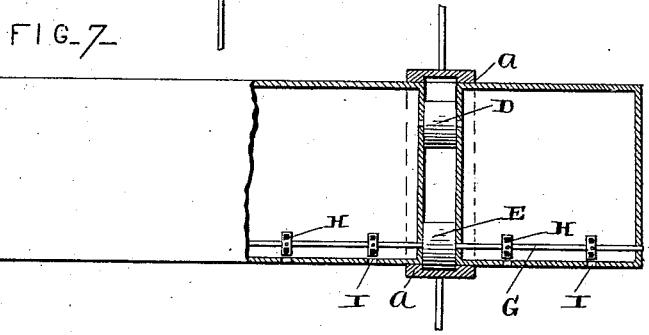
Figure 8:
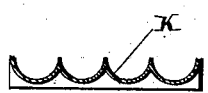
Figure 9:
Figure 10:
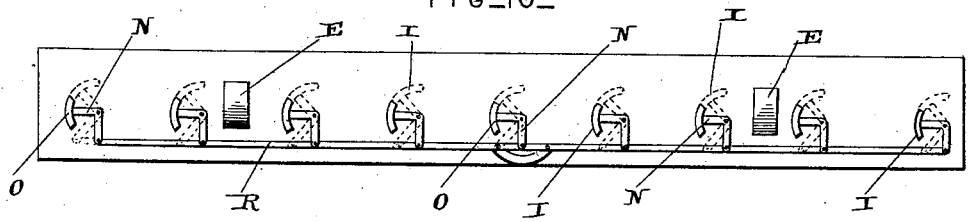

In the drawings, Figure 1 is a rear elevation of a seeder which embodies my invention. Fig. 2 is a vertical cross-section taken through the center of one of the driving-wheels. Fig. 3 is an enlarged perspective view of one of the spreaders. Fig. 4 is a side view of one of the pickers or stirrers. Fig. 5 is an edge view of the same. Fig. 6 is a vertical section similar to Fig. 2, showing sufficient space between the hub of the wheels and the hopper to allow the rod which operates the cut-off to be placed therein. Fig. 7 is an enlarged view of the hopper alone, showing one end in section. Fig. 8 is a cross-section of the spreader, showing the grooves made therein. Fig. 9 is a cross-section of the lower end of the spreader, showing that it has a convex upper surface. Fig. 10 is a bottom view of the hopper, showing the cut-offs.

The present invention has relation to that class of seeders which employ the hopper as a bearing for the driving-wheels, substantially in the manner shown in my aforesaid patents.

The hopper is made preferably circular in shape, though it may be made of any other convenient shape in cross-section that may be preferred. The driving-wheels revolve around the hopper and the hubs of the said wheels are provided with an inwardly-extending flange $a$ at each edge, between which the friction-wheel E and the traveling or guide wheels D revolve, which construction holds the driving-wheels firmly in place as they revolve, and will not allow them any sidewise movement, as will be readily understood. The said wheels E and D extend through slots formed in the hopper, as illustrated. The traveling wheels D are journaled in opposite sides of the hopper and slightly above the center thereof, as shown, and serve to prevent the inner face of the hubs of the driving-wheels from coming in contact with the outer face of the hopper.

Journaled in the lower side of the hopper are two feed-shafts G, one at each end thereof, each of which extends to the center of the hopper. Each of these feed-shafts is provided with a friction-wheel E, which engages the inner face of the hubs of the driving-wheels as they revolve, and which support the weight of the hopper, the seed placed therein, and the driver. This wheel E is driven by frictional contact with the inner face of the hubs, and in turn drives the feed-shafts, to which the feed wheels or agitators H are rigidly secured. In this manner each driving-wheel drives a separate feed-shaft, as will be seen, and which arrangement and construction is much simpler and cheaper than that shown in my aforesaid patents.

Instead of using feed-cups for feeding the seed, I provide the under side of the hopper with a series of openings I, which are circular or curved in shape, as shown, and secured to the feed-shafts directly over these openings are the feed wheels or agitators H. These feed wheels or agitators H are provided for the purpose of preventing the openings from getting stopped up by straws or other obstructions, and thus insuring a continuous flow of seed at all times. As shown, these pickers are provided with the cut-out portions or openings J, which reduce the friction of the stirrers as they revolve through the seed in the hopper, while at the same time they serve the purpose of preventing the openings I from being stopped up, as will be understood. In Fig. 5 it will be seen that these stirrers are bent about half-way around the feed-shafts and then secured thereto by means of rivets I'. Placed directly under these seed-openings I, made in the bottom of the hopper, are the spreaders or scatterers K, which are curved, as shown in Fig. 3, and each of these spreaders is provided with a series of longitudinal grooves, which extend from near their upper ends to a convex portion M at the lower end of the said spreaders. Owing to this construction, the seed fall from the openings I upon the center of the spreaders and are conveyed by the grooves to the convex portion M, which spreads and scatters the seed in a very effective manner.

The means for regulating the size of the openings I, and thus regulating the amount of seed fed to the spreaders, consists of the bell-crank levers N, which are pivoted between their ends to the hopper at one side of the said openings I and carry a curved shut-off or plate O at one end, which extends over the said openings, and connected to the opposite ends of these levers is a rod R, which extends the entire length of the hopper and connects the ends of all of the bell-crank levers, as shown. Pivoted to the rear side of the hopper and at one side of the driver's seat P is a lever Q, which has its lower end connected with the rod R. This lever Q operates the rod R, and through the medium of the rod R all of the cut-offs are operated simultaneously and equally for closing or opening the openings I, and thus regulating the amount of seed fed to the spreaders. The upper end of the operating-lever Q is provided with a catch which engages a quadrant S for locking the lever in any desired position, and thus holding the cut-offs at any desired point. Owing to the shape of the openings I, the seed drop in the center of the spreaders, no matter whether a large or a small amount of seed is being fed thereto.

The above-described construction enables me to greatly simplify and cheapen the construction of my seeder as compared with the construction shown in my said patents.

Whenever it is desired to convey the machine from one field to another or to transport the machine from place to place, or for any other reason it is desired to stop the machine from feeding the seed, it is only necessary to operate the lever Q, so as to close the openings I by means of the plates O without throwing the machine out of gear.

Having thus described my invention, I claim—

1. A seeder comprising a hopper, driving and supporting wheels having hubs which surround the hopper, a feeding-shaft in the bottom of the hopper, carrying a friction-wheel which projects through a slot in the hopper and engages the inner periphery of the said driving-wheel hubs, and two guide-wheels supported by the hopper above a horizontal line drawn through the center of said hubs and engaging the said hubs at this point, whereby substantially all the weight of the hopper is upon said friction-wheel and lateral movement of the hopper prevented, substantially as specified.

2. In a seeder of the character described, a hopper, driving-wheels which have hubs surrounding the said hopper, a driving-wheel for each feeding-shaft, a wheel secured to the said feeding-shaft, which extends through slots in the hopper and engages the inner side of the hub, guide-wheels at opposite sides of the said hopper, the said hubs having inwardly-extending annular flanges between which the feeding-shaft wheel and the guide-wheels revolve, all combined substantially as set forth.

3. In a seeder of the character described, a hopper, driving-wheels having hubs which surround the said hopper, the hopper having a series of openings in its bottom, a feed-shaft journaled in the bottom adjacent to the said openings, stirrers upon the shaft above the openings, a series of bell-crank levers pivoted between their ends to the hopper, carrying a plate which extends over the said openings, and a rod connecting the opposite ends of the said bell-crank levers, all combined to operate in the manner shown and described.

4. A seed-spreader for seeding-machines, consisting of a plate having a series of longitudinal ribs and a convex portion at its lower end, which extends beyond the side of the said ribs, whereby the seed are guided to the convex portion and then spread thereby, substantially as described.

In testimony whereof I affix my signature in presence of two witnesses.

ALONZO STANSEL.

Witnesses:
EDGAR C. BRIDGENS,
LAWRENCE HOFENRICHTER.